J. R. FRENCH.
ENGINE-PISTON RING.
APPLICATION FILED MAY 17, 1920.
1,367,468.
Patented Feb. 1, 1921.
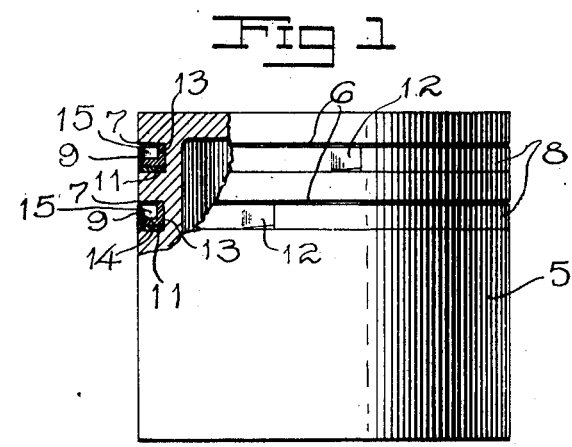
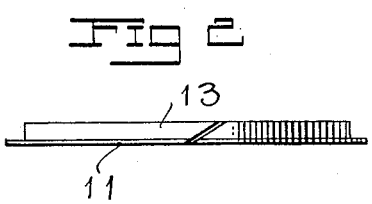
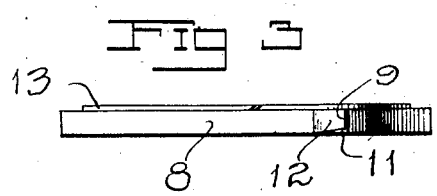
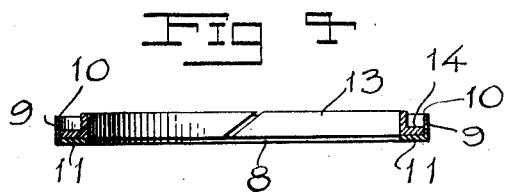
INVENTOR.
James R. French
Watson E. Coleman
ATTORNEY.

UNITED STATES PATENT OFFICE.

JAMES ROBERT FRENCH, OF ROCK ISLAND, ILLINOIS.

ENGINE PISTON-RING.

1,367,468.  Specification of Letters Patent.  Patented Feb. 1, 1921.

Application filed May 17, 1920. Serial No. 382,097.

*To all whom it may concern:*

Be it known that I, JAMES ROBERT FRENCH, a citizen of the United States, residing at Rock Island, in the county of Rock Island and State of Illinois, have invented certain new and useful Improvements in Engine Piston-Rings, of which the following is a specification, reference being had to the accompanying drawings.

This invention relates to engine piston rings, and more particularly to certain improvements in the engine piston ring shown and described in Patent 1,251,212 issued to me December 25th, 1917.

It is the object of the present improvement to provide a piston ring which coöperates with the projecting portions of the piston caused by the piston ring groove to form a chamber in which gases enter and expand the ring, thereby causing the ring to snugly and firmly engage the cylinder wall and prevent escape of gases between the cylinder and the piston.

A further object is to provide a piston ring having a wall which partially closes the opening of the piston ring groove and coöperates with the projecting portion of the piston caused by the groove to provide an entrance for the gases into the chamber formed by the ring and piston.

These objects are attained by the mechanism illustrated in the accompanying drawing, in which:—

Figure 1 is a side elevation and sectional view of the piston with the ring in position.

Fig. 2 is a detail view of the inner section of the ring.

Fig. 3 is a detail view of the sections assembled.

Fig. 4 is a sectional view of the assembled ring.

Referring to the drawing, 5 designates a piston of conventional form having the usual piston ring grooves 6. As a result of the groove, the outer edge of the head 7 of the piston projects over the space caused by the groove. A split ring 8 is provided and is intended to be disposed in the groove adjacent the head of the piston and is of sufficient thinness to render the ring ductile or flexible. This ring comprises an outer wall or flange 9 having its upper and lower edges beveled as at 10 and is of sufficient height to partially close the opening of the groove and coöperate with the projecting portion 7 of the piston to provide an inlet for gases admitted to the cylinder.

Extending inwardly from the wall 9 of the ring 8 is an annular flange 11 which is intended to engage the lower surface of the groove. One end of the split portion of the ring 8 is tapered as at 12, and is intended to engage the interior surface of the wall 9 and upper surface of the flange 11 and provides a perfect connection for the ends of the ring 8.

An expansible ring 13 is provided and is intended to engage the inner wall of the groove. Extending outwardly from the lower portion of the ring 13 is an annular flange 14. The ring 13 is intended to be disposed in the groove upon the flange 11 of the ring 8, the flange 14 of the ring 13 coöperating with the wall 9 of the ring 8 and projecting portions 7 of the piston head to form a gas receiving chamber 15.

In operation, should any of the gases during the explosion in the combustion chamber tend to escape between the piston and cylinder, the gases will be received into the chamber 15 and as the ring 8 is of thin, ductile or flexible sheet metal, it will be forced outwardly into engagement with the cylinder wall, by the expansion of the gas against the inner wall of the ring 8. The pressure of the gas will also engage the outer surface of the ring 13 and force it into engagement with the groove to prevent the escape of gas around the piston ring. In addition to the flexibility of the ring 8, the split portion will greatly assist the ring to resist any action that would tend to retard or prevent the expansion of the ring.

From the foregoing description, it will be readily seen that through the novel arrangement of the rings 8 and 13 and coöperation with the projecting head of the piston, a novel form of chamber is provided which does not in any way interfere with the full explosive power of the gases, but at the same time receives a portion of the gas and efficiently expands the ring to prevent the escape of the gas between the cylinder and piston. It will, of course, be understood that the ring 8 may be made of any desired material which is capable of standing wear and at the same time is ductile or flexible so that it will easily expand under the pressure of the gas.

What is claimed is:—

1. The combination with an engine piston having an annular groove in its periphery, of an expansible ring engaging the inner side walls of the groove, said ring having an outwardly projecting annular flange, an expansible ring of relatively thin ductile sheet metal having an inwardly projecting annular flange disposed between the lower wall of the groove and the flange of the first mentioned ring, the outer wall of said sheet metal ring terminating adjacent the upper wall of the groove to form a chamber, the space between the upper wall of the groove and the last mentioned ring forming an entrance to said chamber.

2. The combination with an engine piston having an annular groove in its periphery, of an expansible ring substantially L-shape in cross section engaged with the inner side wall of the groove, an expansible ring substantially L-shape in cross section and having its lower face engaged with the bottom of the groove, said ring also supporting the first mentioned ring, said second mentioned ring coacting with the first mentioned ring to form a chamber within the groove, the wall of the second mentioned ring terminating in annular spaced relation to the upper wall of the groove to form an entrance to said chamber.

In testimony whereof I hereunto affix my signature.

JAMES ROBERT FRENCH.